United States Patent [19]

Corby et al.

[11] Patent Number: 4,792,112

[45] Date of Patent: Dec. 20, 1988

[54] MOLD FOR FORMING CONTAINER ADAPTER

[75] Inventors: Kenneth D. Corby; Luke T. Faulstick, both of Rochester, N.Y.

[73] Assignee: Eastman Kodak Corporation, Rochester, N.Y.

[21] Appl. No.: 85,450

[22] Filed: Aug. 14, 1987

[51] Int. Cl.$^4$ .............................................. B28B 7/02
[52] U.S. Cl. .................... 249/155; 425/356; 425/394; 425/406
[58] Field of Search ................... 249/155, 96; 425/388, 425/405.1, 84, 85, 356, 404, 383, 394, 406

[56] References Cited

U.S. PATENT DOCUMENTS

| | | | |
|---|---|---|---|
| 3,002,250 | 10/1961 | Huet | 25/121 |
| 3,635,642 | 1/1972 | Mueller | 425/470 |
| 3,642,400 | 2/1972 | Theodorsen | 249/162 |
| 3,692,450 | 9/1972 | Feldman | 249/155 |
| 4,156,516 | 5/1979 | Oliver | 249/53 R |
| 4,637,789 | 1/1987 | Netzik | 425/89 |
| 8,007,590 | 10/1905 | Noble | 249/155 |

FOREIGN PATENT DOCUMENTS 1107267  8/1955  France ............................ 425/388

Primary Examiner—Bernard Nozick
Attorney, Agent, or Firm—William C. Dixon

[57] ABSTRACT

A readily adjustable mold is provided for transforming a heated plastic sheet into an adapter intended to restrain a received article from moving inside a container larger than the article. The adapter to be formed has a base configured to fit snugly within the container and a plurality of projections on the base that are spaced from each other to receive the article snugly therebetween. The mold comprises means including side and bottom walls that define a cavity with peripheral and medial regions, for operatively positioning the plastic sheet for formation of the adapter, and means disposed in the cavity peripheral region and moveable toward and away from the cavity medial region, for selectively locating the projections on the adapter base. The locating means in the peripheral region may include one or more projection-forming member(s) slideably mounted on each of at least two of the side walls for selective movement toward and away from the medial region. Any such member(s) may be independently moveable for such selective movement individually. The peripheral region may further include a removably insertable member adjacent to at least one of the side walls, to reduce at least one outside dimension of the adapted. Inwardly adjacent to that member, another such member may be disposed to further reduce said dimension(s), and may have one or more projection-forming member(s) extending therefrom toward the medial region to help center the received article in its container.

12 Claims, 15 Drawing Sheets

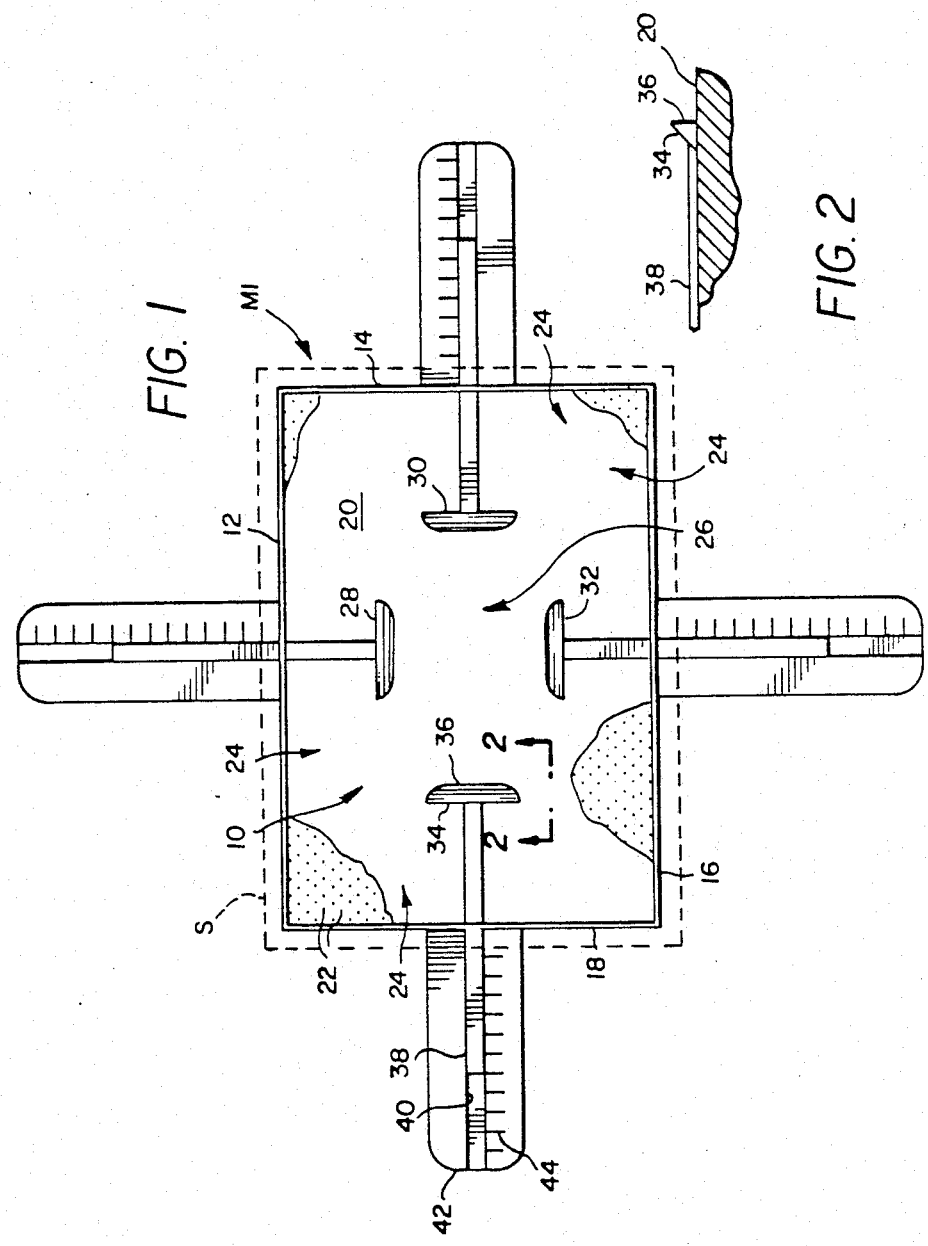

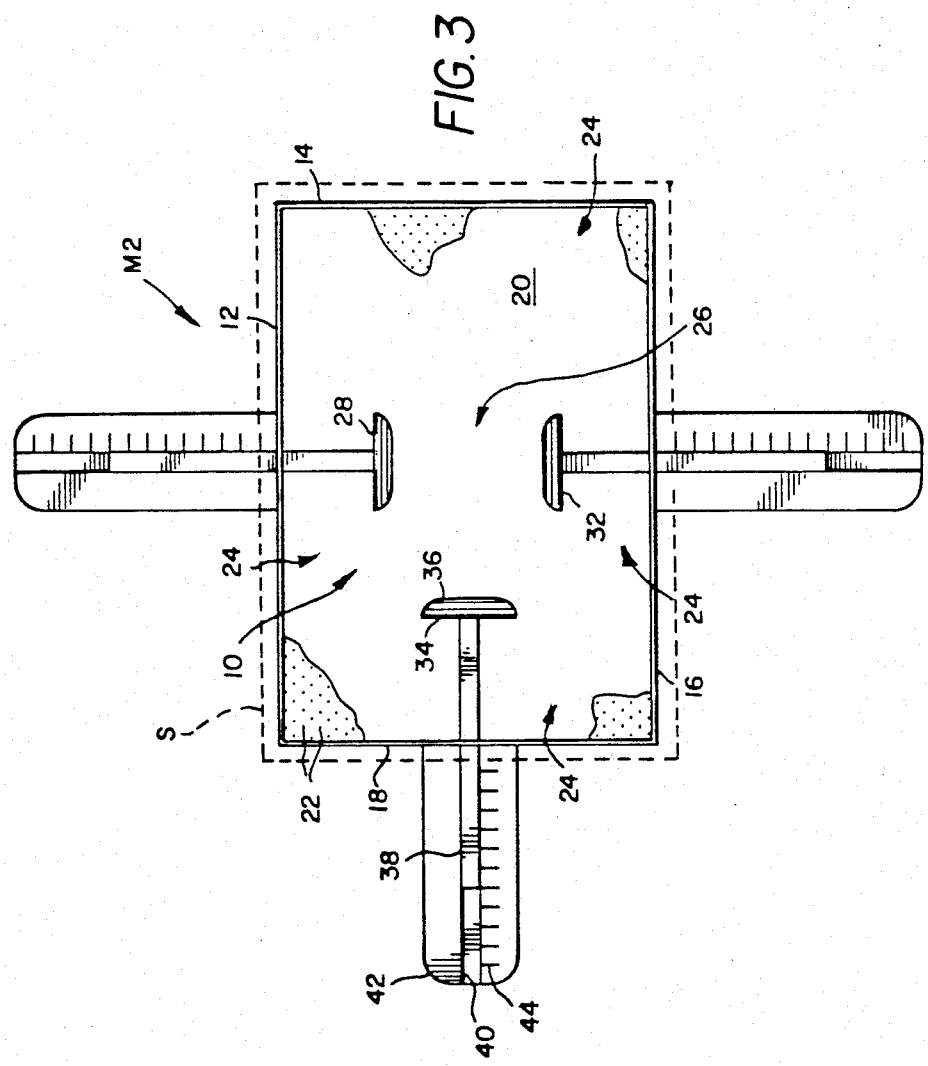

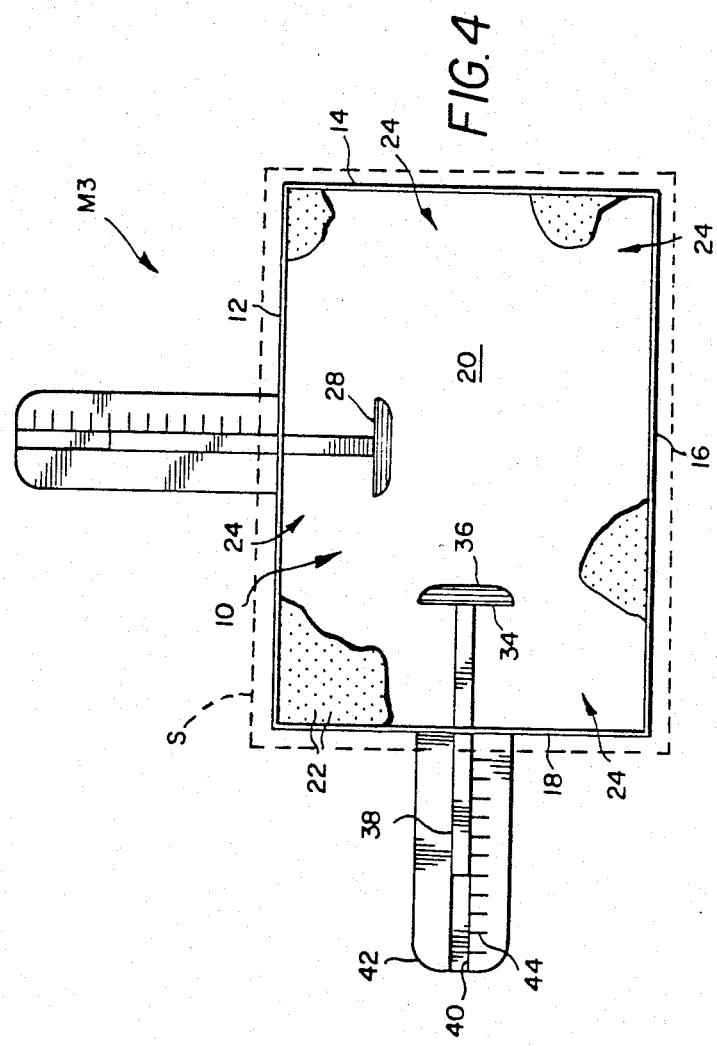

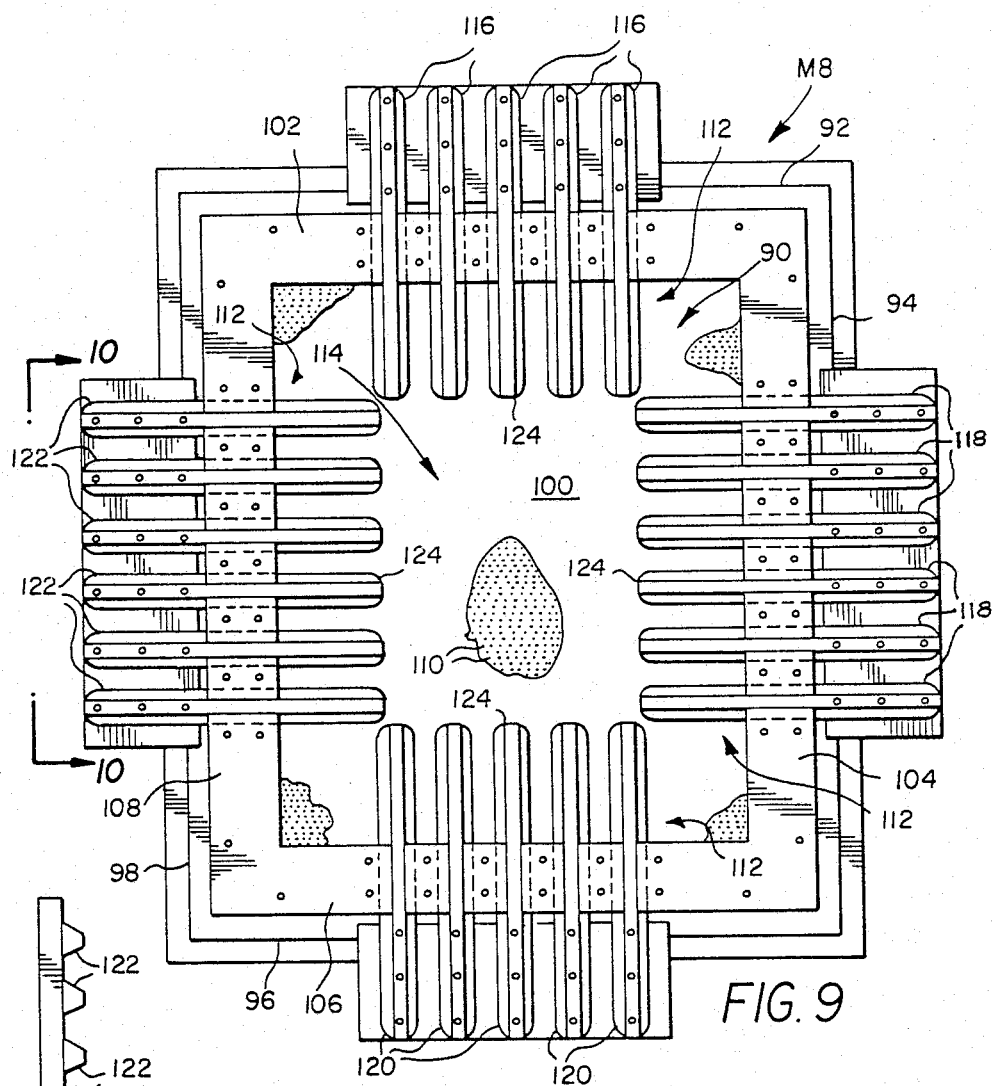
FIG. 9
FIG. 10
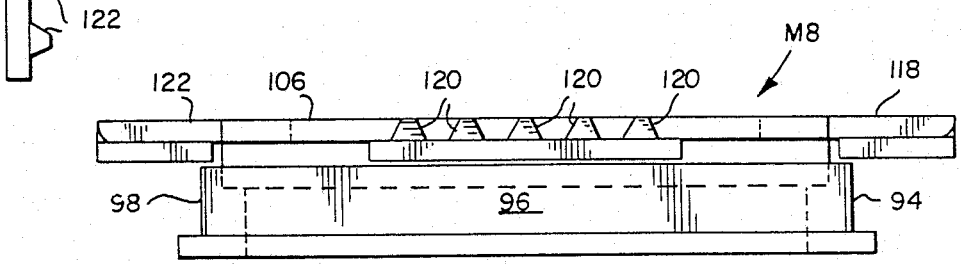
FIG. 11

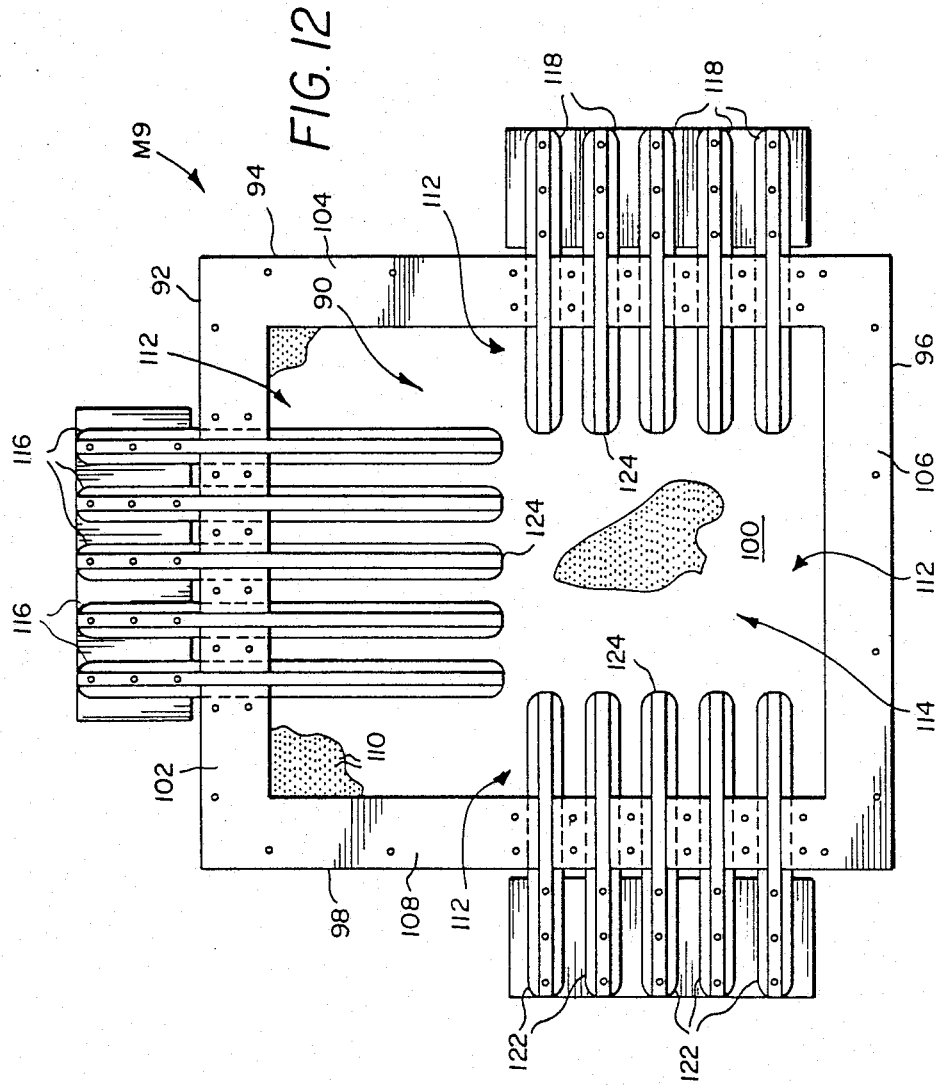

MOLD FOR FORMING CONTAINER ADAPTER

BACKGROUND OF THE INVENTION

1. Field of the Invention

The present invention relates generally to adjustable molds, and particularly to such molds used for forming container adapters that are configured to restrain an object from moving inside a container.

2. Description of the Prior Art

The prior art is replete with adjustable casting and molding devices adapted to form a wide variety of objects. Examples may be found in the following prior-art patents:

U.S. Pat. No. 3,002,250—Discloses an adjustable frame for casting concrete members of various sizes using adjustably interconnected standard-size frame elements.

U.S. Pat. No. 3,635,642—Discloses a flexible molding device, including flexible magnetic wall elements, for molding various sizes and shapes of articles.

U.S. Pat. No. 4,156,516—Discloses several flexible molding schemes, each including flexible sidewall sections and means for connecting them to each other and to a rigid bottom wall, for molding various sizes and shapes of articles.

U.S. Pat. No. 4,637,789—Discloses an adjustable frame for molding plastic objects of various sizes using adjustably interconnected frame sections.

While the above devices have proven useful for their stated purposes, there has remained a persistent need for a mold which is readily adjustable to form container adapters that are specially configured for holding various sizes and shapes of articles in given-size containers.

SUMMARY OF THE INVENTION

Accordingly, a primary object of this invention is to meet the foregoing need for such a readily adjustable mold. Another object is to fill that need in an economical and cost-effective manner. Those and other objects have been achieved by the invention herein claimed.

This invention finds particular utility in a mold for transforming a heated plastic sheet into an adapter intended to restrain a received article from moving inside a container larger than the article. The adapter to be formed has a base configured to fit snugly within the container and a plurality of projections on the base that are spaced from each other to receive the article snugly therebetween. The mold comprises: means including side and bottom walls defining a cavity with peripheral and medial regions, for operatively positioning the plastic sheet for formation of the adapter; and means disposed in the cavity peripheral region and moveable toward and away from the cavity medial region, for selectively locating the projections on the adapter base.

As described and illustrated herein, the locating means in the peripheral region may include one or more projection-forming members slideably mounted on each of at least two of the side walls for selective movement toward and away from the medial region. Should more than one projection-forming member be so mounted on the same side wall, those members may be independently moveable, relative to one another, for such selective movement individually. The peripheral region may further include a removably insertable member adjacent to at least one of the side walls; and inwardly adjacent to that member, another such member may be disposed with or without one or more projection-forming members extending therefrom toward the medial region.

This invention, and its objects and advantages, will become more apparent in the detailed description of its several embodiments presented hereinbelow.

BRIEF DESCRIPTION OF THE DRAWINGS

In the detailed description of embodiments of this invention presented below, reference is made to the accompanying drawings, wherein like reference numerals denote like elements, and wherein:

FIGS. 1 and 2 are top-plan and cross-sectional views, respectively, illustrating an adjustable mold configured in accordance with a first embodiment of this invention, FIG. 2 being taken along line 2—2 in FIG. 1;

FIGS. 3 and 4 are top-plan views depicting, respectively, adjustable molds configured according to second and third embodiments of the invention;

FIG. 9 and FIGS. 10–11 are top-plan and side-elevation views, respectively, illustrating an adjustable mold configured in accordance with an eighth embodiment of the invention, FIG. 10 being taken along line 10—10 in FIG. 9;

FIG. 9a and FIGS. 9b–9c are top-plan and cross-sectional views, respectively, depicting an article-container adapter of a type that may be formed by the mold of FIGS. 9–11, FIGS. 9b and 9c being taken respectively along lines 9b—9b and 9c—9c in FIG. 9a;

FIGS. 12, 13, 14, 15, and 16 are top-plan views depicting, respectively, adjustable molds configured according to ninth, tenth, eleventh, twelfth, and thirteenth embodiments of this invention; and FIG. 15a and FIGS. 15b–15c are top-plan and cross-sectional views, respectively, of an article-container adapter of a type that may be formed by the mold of FIG. 15, FIGS. 15b and 15c being taken respectively along lines 15b—15b and 15c—15c in FIG. 15a.

DESCRIPTION OF THE ILLUSTRATED EMBODIMENTS

Because certain parts of adjustable molds are well known, the following description is directed in particular to those elements forming, cooperating directly with, or relating to, the present invention. Elements not specifically shown or described here are selectable from those known in the pertinent art.

The readily adjustable molds herein described and illustrated as embodiments of this invention are intended to facilitate rapid manufacture of article-container adapters such as those disclosed in commonly assigned copending U.S. patent application Ser. No. 085,449, titled CONTAINER ADAPTER, filed concurrently herewith and incorporated by reference herein. Such adapters as there described may be made efficiently from flat sheets of formable plastic which are cut from larger flat or roll stock so as to fit, when appropriately formed, into "standard-size" containers, usually boxes. Standard-size boxes are readily available at relatively low cost because of their automated manufacture in large quantities. Each plastic sheet is thermoformed, in a specially prepared adjustable mold (e.g., one of those described here), to provide a one-piece plastic insert configured to fit snugly inside a standard-size box and hold snugly the article to be contained.

An insert so configured thus adapts the available space in a standard-size box to the smaller spatial requirements of the article. In so doing, the insert restrains the article from moving or rattling inside the box, and thus protects the article from damage during shipment and handling. When articles of various sizes and shapes are to be contained, use of such inserts with standard-size boxes can substantially reduce the number of more costly special-size boxes that otherwise would be required. Also, since inserts for a variety of articles can be readily molded on site when needed, a significant saving in packaging and delivery time can be realized.

Adjustable molds especially suitable for making such inserts, or adapters, may be constructed in accordance with the illustrated embodiments of this invention. Those embodiments will now be described with particular reference to their respective drawing figures.

First Embodiment

Figure 1A:
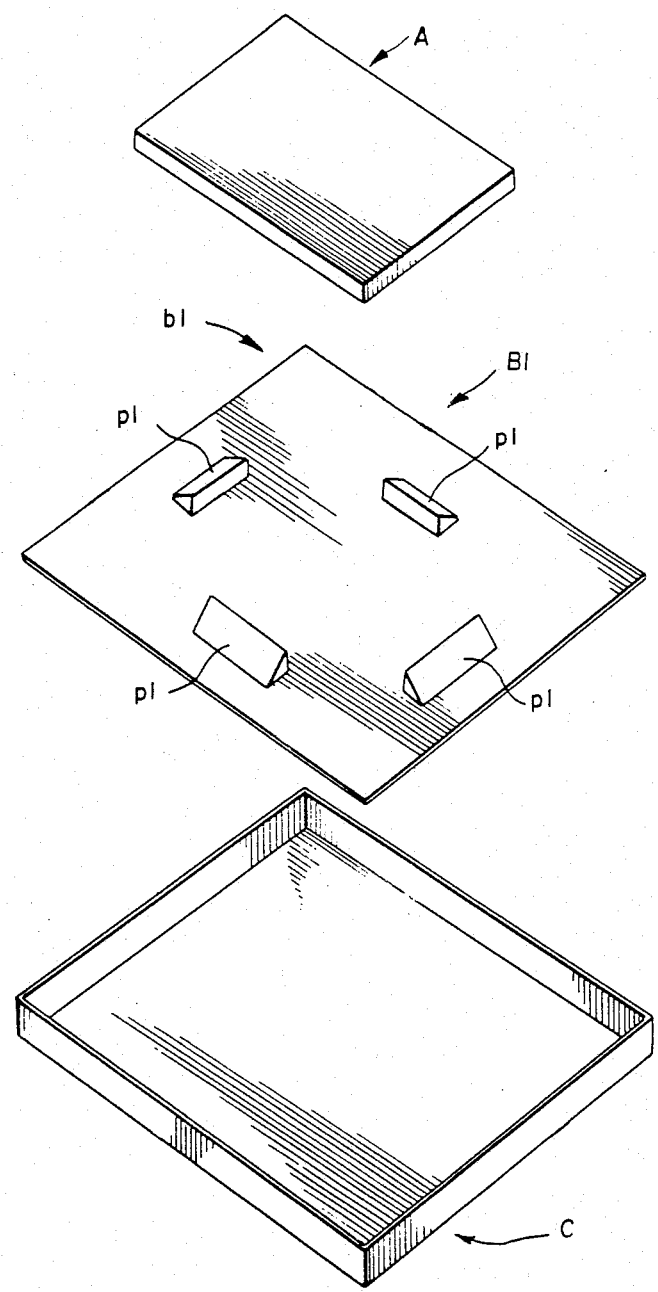
FIG. 1a is a schematic perspective view illustrating an article-container adapter of a type that may be formed by the mold of FIGS. 1 and 2.

FIGS. 1 and 2 illustrate an adjustable mold M1 for transforming a heated pre-cut plastic sheet S (shown in FIG. 1 by phantom outline) into a container adapter, such as first-embodiment adapter B1 disclosed in the above-reference application. As depicted here in FIG. 1a, the adapter B1 to be formed has a base b1 configured to fit snugly inside a given-size container C and a plurality of projections p1 on the base that are spaced from each other to receive an inserted article A snugly therebetween. Mold M1 comprises a cavity 10 defined by side walls 12, 14, 16, 18 and bottom wall 20. Bottom wall 20 has perforations 22 therein for facilitating creation of a pressure differential at opposite sides of an operatively positioned plastic sheet. Cavity 10 includes a peripheral region 24 in the vicinity of side walls 12, 14, 16, 18 and a centrally disposed medial region 26.

In peripheral region 24 are four projection-forming members 28, 30, 32, 34 that are sideably mounted on side walls 12, 14, 16, 18, respectively, for selective movement toward and away from medial region 26. The inner-end portion of each projection-forming member (see member 34) has an inward-facing surface 36 of polygonal configuration, e.g., rectangular or trapezoidal, which is substantially perpendicular to bottom wall 20 and faces medial region 26. The outer-end portion of each such member (again see member 34) comprises a rod 38 that extends outwardly through a suitable opening in the cavity side wall and into a mating groove 40 formed in an underlying support member 42, which projects outwardly from the sidewall as shown. Any convenient means for readily moving each projection-forming member toward and away from medial region 26 may be employed. Support member 42 is provided with a scale 44 alongside groove 40 to indicate the longitudinal position of rod 38. Scale 44 may be calibrated to indicate, in advance, the position at which rod 38 is to be set for each size of article to be contained.

In use, the overall size of cavity 10, as defined by the dimensions of side walls 12, 14, 16, 18, is made to conform to the interior dimensions of the given-size container to be used. The projection-forming members 28, 30, 32, 34 are then moved toward or away from medial region 26 so as to place their inward-facing surfaces 36 in positions appropriate for locating the adapter projections in their spaced-apart relationship needed to receive the inserted article snugly therebetween.

Both the mold and the pre-cut plastic sheet are heated to a forming temperature suitable for the plastic material being used. The heat-softened plastic sheet is then lowered onto the pre-heated mold, which operatively positions the sheet for formation of the desired adapter. By means of perforations 22 in bottom wall 20 and an appropriate supply of air pressure and/or vacuum, a pressure differential across the top and bottom surfaces of the sheet is then established, e.g., by applying air pressure to the top surface and/or vacuum to the bottom surface. The pressure differential forces and/or draws the operatively positioned sheet into the mold cavity and around its preset projection-forming members, thereby forming the sheet into the desired adapter shape.

Upon completion of the forming step, the pressure differential is discontinued and the formed adapter allowed to cool. When the adapter has cooled sufficiently, it is removed from the mold, e.g., by air pressure forcibly applied to its bottom surface via perforations 22. Because the adapter has been formed from a plastic sheet that was pre-cut to specified dimensions, and formed in a mold cavity that was pre-sized in accordance with the given-size container to be used, the adapter when removed from the mold is finished and ready to fit snugly in that size container, with no need to trim off any excess plastic material.

Second Embodiment

FIG. 3 depicts an adjustable mold M2 which is identical to mold M1 in FIGS. 1–2 except that mold M2 has only three projection-forming members 28, 32, 34 slideably mounted on side walls 12, 16, 18, respectively, for selective movement toward and away from medial region 26. As shown in FIG. 3, there is no projection-forming member on side wall 14. According to this embodiment, the resulting adapter will have only three projections, as formed by members 28, 32, 34, for restraining an article inside its container.

Third Embodiment

FIG. 4 depicts an adjustable mold M3 which is identical to mold M2 in FIG. 3 except that mold M3 has only tow projection-forming members 28, 34 slideably mounted on side walls 12, 18 respectively. As shown in FIG. 4, there are no projection-forming members on side walls 14, 16. According to this embodiment, the adapter will have only two projections, as formed by members 28, 34, for restraining an article inside its container.

Fourth Embodiment

Figure 5:
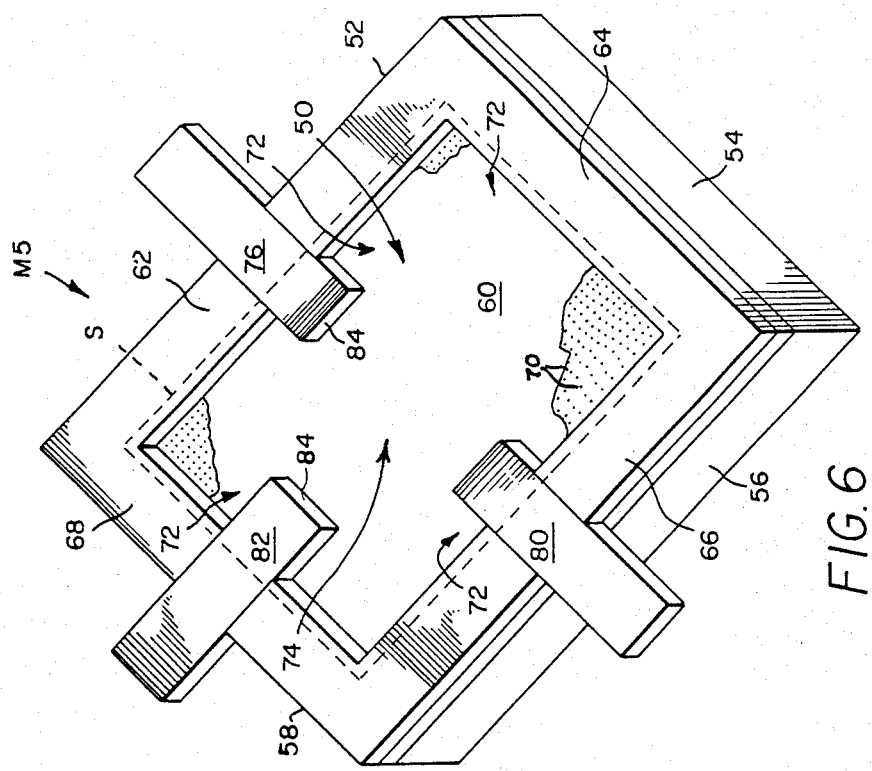
FIGS. 5, 6, 7, and 8 are schematic perspective views showing, respectively, adjustable molds according to fourth, fifth, sixth, and seventh embodiments of the invention.

FIG. 5 illustrates an adjustable mold M4 for transforming heated pre-cut plastic sheet S (shown in FIG. 5 by phantom outline) into a container adapter, such as second-embodiment adapter B2 disclosed in the above-referenced application. As in the first embodiment of this invention, and as depicted here in FIGS. 5a–5d, the adapter B2 to be formed by mold M4 has a base b2 configured to fit snugly inside given-size container C and a plurality of projections p2 on the base that are spaced from each other to receive inserted article A snugly therebetween. Mold M4 comprises a cavity 50 defined by side walls 52, 54, 56, 58 and bottom wall 60. The side walls include inwardly overhanging flange portions 62, 64, 66, 68, as shown. The bottom wall has perforations 70 therein to facilitate creating a pressure differential above and below the plastic sheet. Cavity 50 includes a peripheral region 72, in the vicinity of the side walls, and a centrally disposed medial region 74. In peripheral region 72 are four rectangular-shaped projection-forming members 76, 78, 80, 82 that are slideably mounted on side wall flange portions 62, 64, 66, 68, respectively, for selective movement (by suitable means, not shown) toward and away from medial region 74. The inner end of each projection-forming member has an inward-facing rectangular surface 84 substantially perpendicular to bottom wall 60.

In operation, this mold is very similar to mold M1 of the first embodiment. The rectangular projection-forming members of mold M4, however, form projections that are shaped as rectangular blocks extending both upwardly from the bottom and inwardly from the sides of the adapter base, a configuration providing greater strength and rigidity to the whole adapter. According to this embodiment, the adapter may be formed with walls of sufficient thickness and opacity to obviate a container bottom, and thus require only a container cover, or lid L (FIG. 5d), to enclose its open top.

Fifth Embodiment

Figure 6:
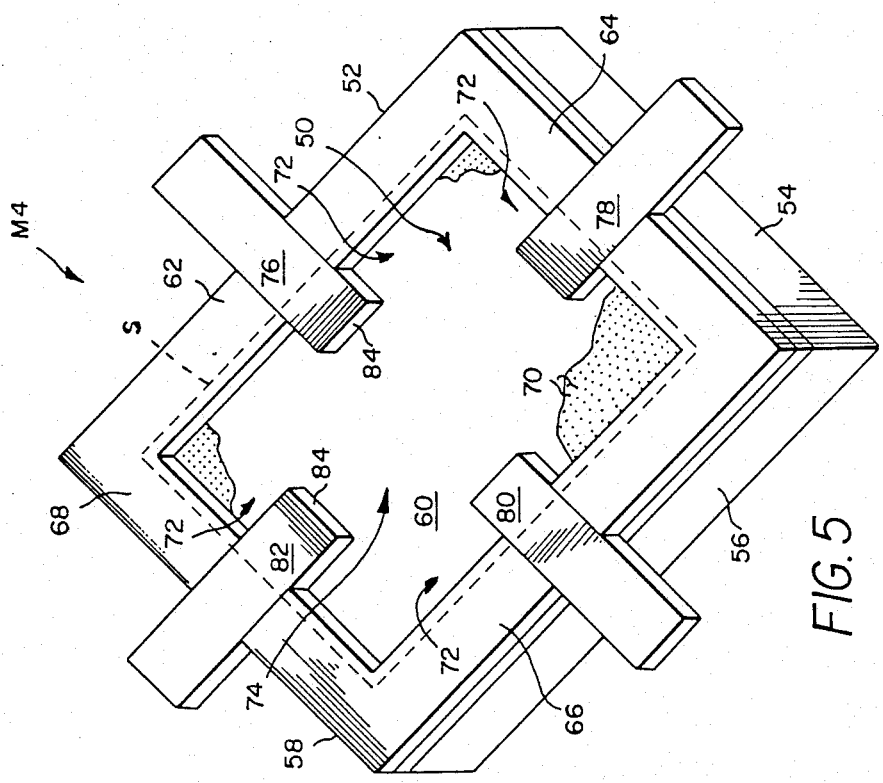
Figure 5A:
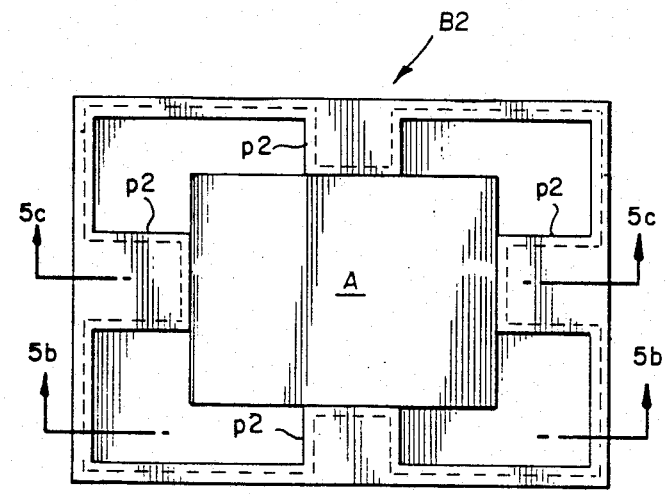
FIG. 5a and FIGS. 5b–5d are top-plan and cross-sectional views, respectively, illustrating an article-container adapter of a type that may be formed by the mold of FIG. 5, FIGS. 5b and 5d being taken along line 5b—5b in FIG. 5a, and FIG. 5c along line 5c—5c.
Figure 5B:
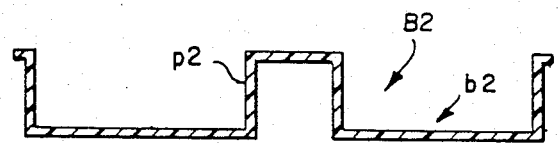
Figure 5C:
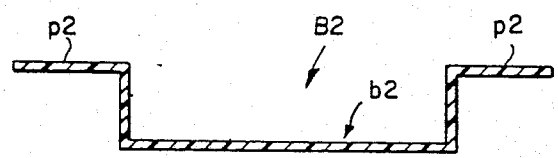
Figure 5D:
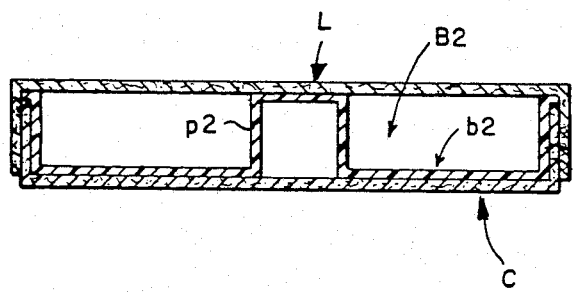

FIG. 6 depicts an adjustable mold M5 which is identical to mold M4 in FIG. 5 except that mold M5 has only three projection-forming members 76, 80, 82 slideably mounted on side wall flange portions 62, 66, 68, respectively, for selective movement toward and away from medial region 74. As shown in FIG. 6, there is no projection-forming member on side wall flange portion 64. According to this embodiment, the resulting adapter will have only three projections, as formed by members 76, 80, 82, and its outer wall formed by side wall 54, for restraining a received article.

Sixth Embodiment

Figure 7:
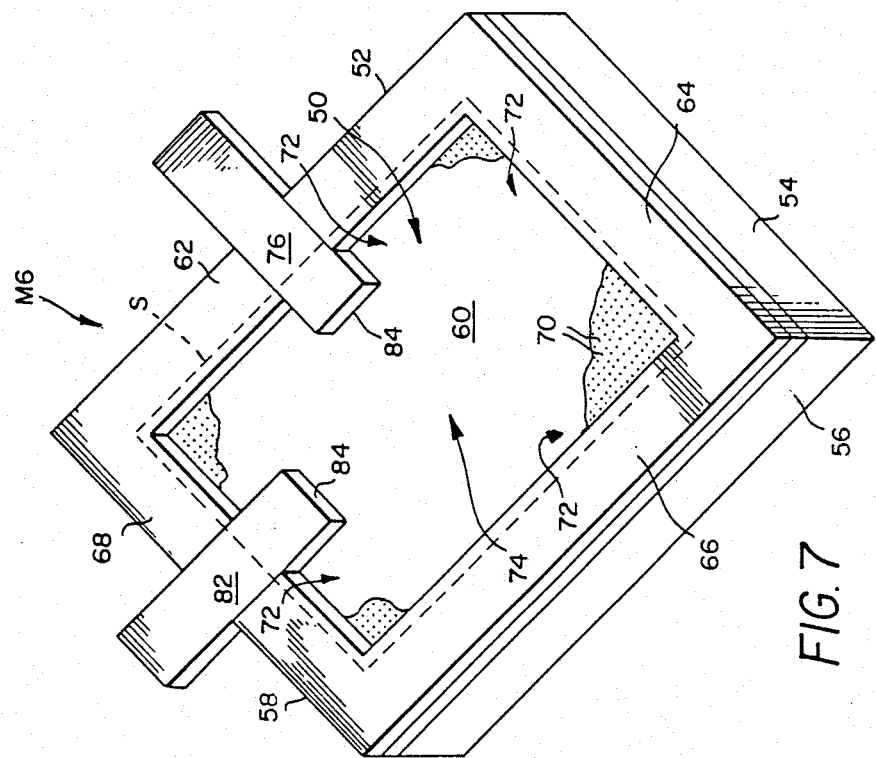

FIG. 7 depicts an adjustable mold M6 which is identical to mold M5 in FIG. 6 except that mold M6 has only two projection-forming numbers 76, 82 slideably mounted on side wall flange portions 62, 68, respectively, for selective movement toward and away from medial region 74. As shown in FIG. 7, there are no projection-forming members on side wall flange portions 65, 66. According to this embodiment, the adapter will have only two projections, as formed by members 76, 82, and its outer walls formed by side walls 54, 56, for restraining a received article.

Seventh Embodiment

Figure 8:
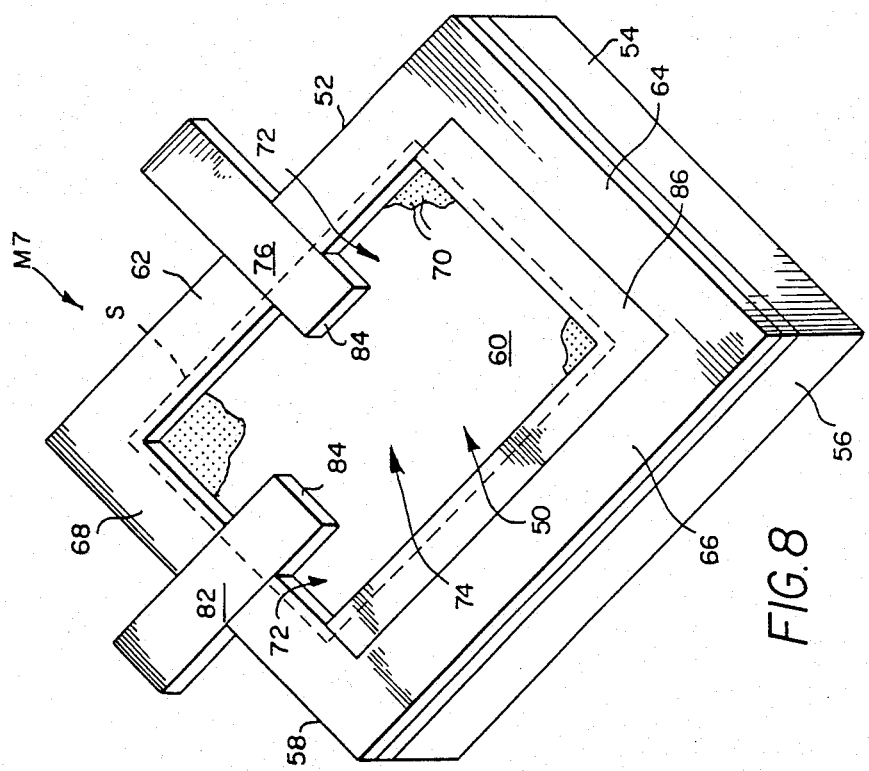

FIG. 8 depicts an adjustable mold M7 which is identical to mold M6 in FIG. 7 except for the addition of a significant feature made possible by the absence of projection-forming members from side wall flange portions 64, 66. Mold M7 has in its peripheral region 72, adjacent to flange portions 64, 66, a removably insertable member 86. Because of its L-shape, member 86 in effect extends both of those flange portions, and thus side walls 54, 56, inwardly toward medial region 74, so as to reduce the overall size of the resulting adapter when a smaller-size container will suffice for a given article. Member 86 thus increases the flexibility of this mold to accommodate a wider range of container, adapter, and article sizes. Although not shown, a non-L-shaped insert could be used in lieu of member 86 to accomplish the same general purpose. For example, a simple bar-like member could be inserted next to flange portion 64 or flange portion 66, and thereby extend only one side wall inwardly, to accommodate a particular size or shape of container.

Eighth Embodiment

Figure 9A:
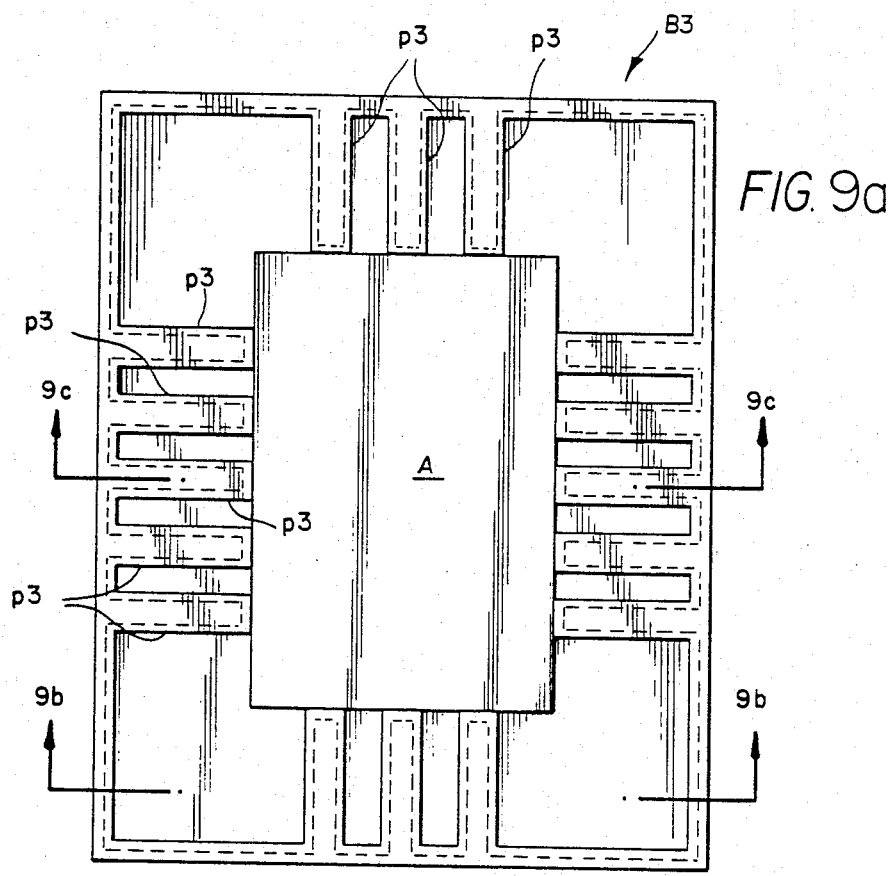
Figure 9B:
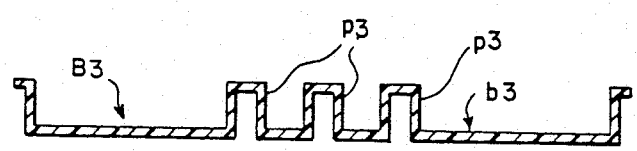
Figure 9C:
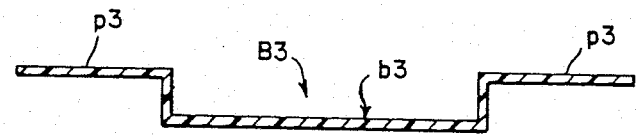

FIGS. 9, 10, and 11 illustrate an adjustable mold M8 for transforming a heated pre-cut plastic sheet (not shown) into a container adapter similar to third-embodiment adapter B3 disclosed in the above-referenced application there disclosed, and as here depicted in FIGS. 9a–9c, adapter B3 has a base b3 configured to fit snugly inside a container and a plurality of projections p3 extending inwardly from each side of the base and spaced to receive article A snugly therebetween. Mold M8 thus is similar to mold M4 in FIG. 5 but differs therefrom in one significant respect. Mold M8 comprises a cavity 90 defined by side walls 92, 94, 96, 98 and bottom wall 100. The side walls include inwardly overhanging flange portions 102, 104, 106, 108, as shown. The bottom wall has perforations 110 therein to facilitate creating a pressure differential above and below an operatively positioned plastic sheet. Cavity 90 includes a peripheral region 112, in the vicinity of the side walls, and a centrally disposed medial region 114.

In peripheral region 112 are four pluralities of distinct, spaced-apart, relatively narrow projection-forming members 116, 118, 120, 122 that are slideably mounted on side wall flange portions 102, 104, 106, 108, respectively, for selective movement toward and away from medial region 114. The inner end of each such member has an inward-facing surface 124 disposed substantially perpendicular to bottom wall 100. The aforementioned significant respect in which this mold differs from mold M4 is thus the presence of a plurality of distinct projection-forming members, instead of a single, relatively wide projection-forming member, on each side wall. The resulting greater number of projections on an adapter formed by mold M8 provides more strength and rigidity to the adapter than can be achieved by mold M4, and thereby permits a corresponding reduction in adapter wall thickness and forming cycle time.

Ninth Embodiment

FIG. 12 depicts an adjustable mold M9 which is identical to mold M8 in FIGS. 9–11 except that mold M9 has only three pluralities of projection-forming members 116, 118, 122 slideably mounted on side wall flange portions 102, 104, 108, respectively, for selective movement toward and away from medial region 114. As shown in FIG. 12, there are no projection-forming members on side wall flange portion 106. According to this embodiment, the resulting adapter will have only three pluralities of projections, as formed by members 116, 118, 122, and its outer wall formed by side wall 96, for restraining a received article. An example of such an adapter is fourth-embodiment adapter B4 in the above-referenced application.

Tenth Embodiment

Figure 13:
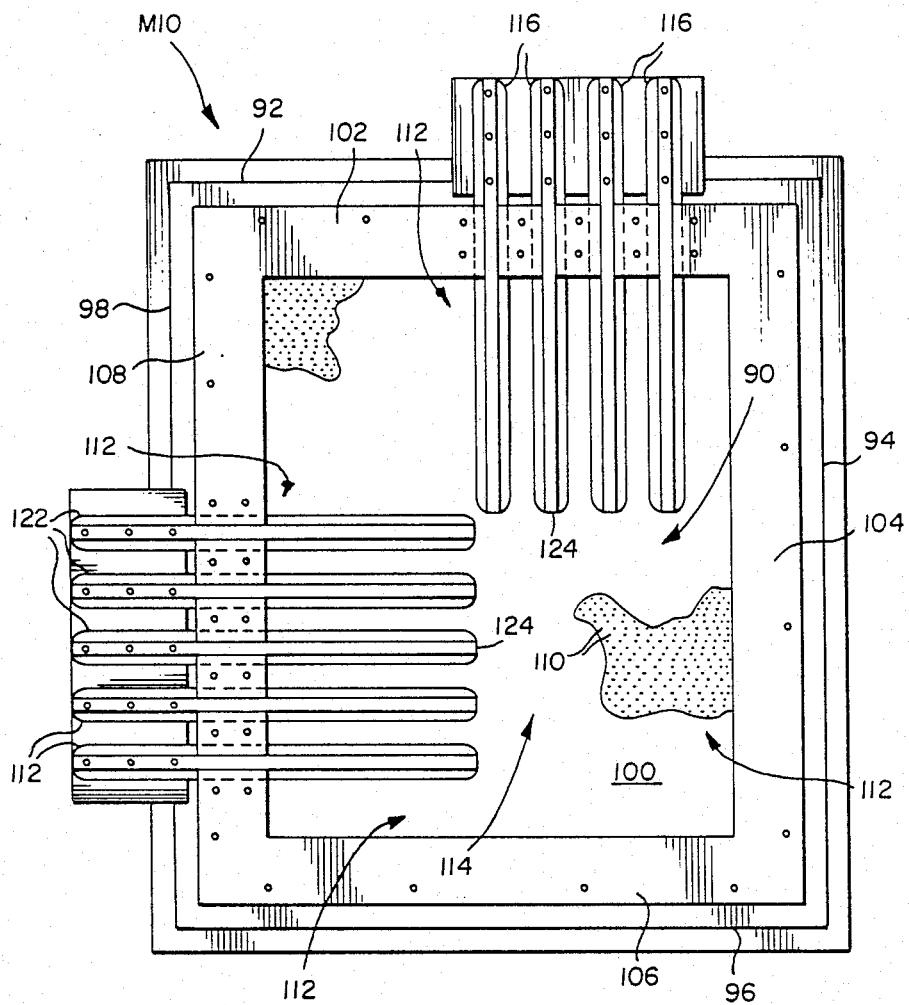

FIG. 13 depicts an adjustable mold M10 which is identical to mold M9 in FIG. 12 except that mold M10 has only two pluralities of projection-forming members 116, 122 slideably mounted on side all flange portions 102, 108, respectively, for selective movement toward and away from medial region 114. As shown in FIG. 13, there are no projection-forming members on side wall flange portions 104, 106. According to this embodiment, the adapter will have only two pluralities of projections, as formed by members 116, 122, and its outer walls formed by side walls 94, 96, for restraining a received article. An example of such an adapter is fifth-embodiment adapter B5 in the above-referenced application.

Eleventh Embodiment

Figure 14:
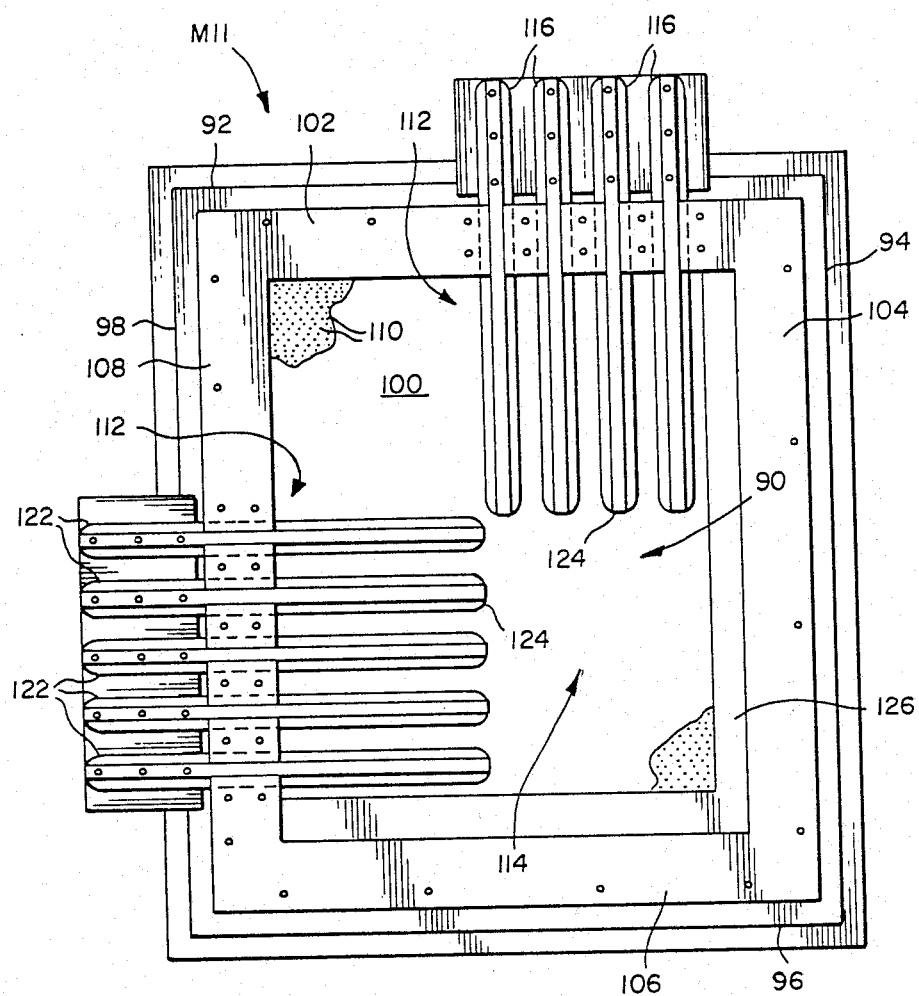

FIG. 14 depicts an adjustable mold M11 which is identical to mold M10 in FIG. 13 except for the addition of a significant feature (as in mold M7 of FIG. 8) permitted by the absence of projection-forming members from side wall flange portions 104, 106. Mold M11 has in its peripheral region 112, adjacent to flange portions 104, 106, a removably insertable member 126. Because of its L-shape, member 126 in effect extends both of those flange portions, and thus side walls 94, 96, inwardly toward medial region 114, so as to reduce the overall size of the resulting adapter when a smaller-size container will suffice for a given article. Member 126 thus increases the flexibility of this mold to accommodate a wider range of container, adapter, and article sizes. As with mold M7 in FIG. 8, a non-L-shaped insert could be used in lieu of member 126 to accomplish the same general purpose. For example, a straight bar-like member could be inserted next to flange portion 104 or flange portion 106, and thereby extend only one side wall inwardly, to accommodate a particular size or shape of container.

Twelfth Embodiment

Figure 15:
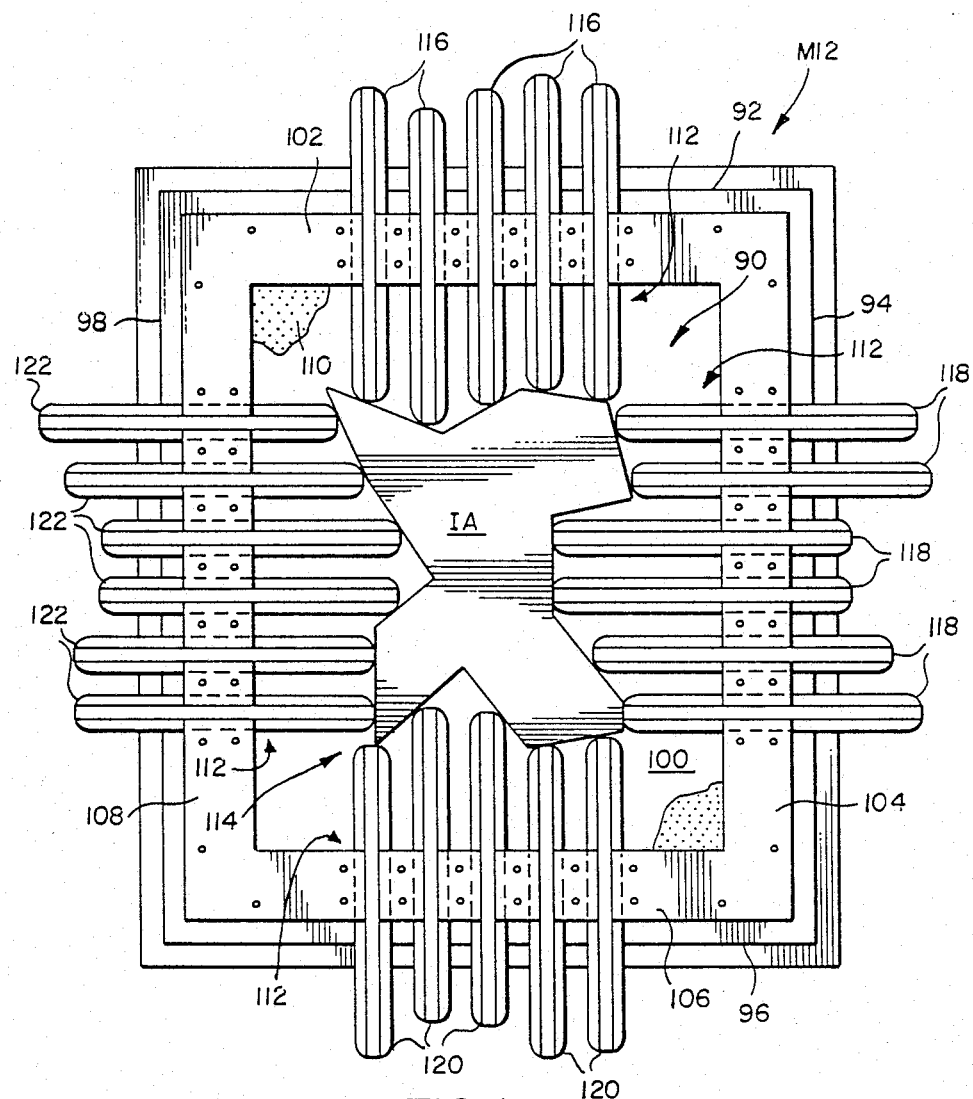
Figure 15A:
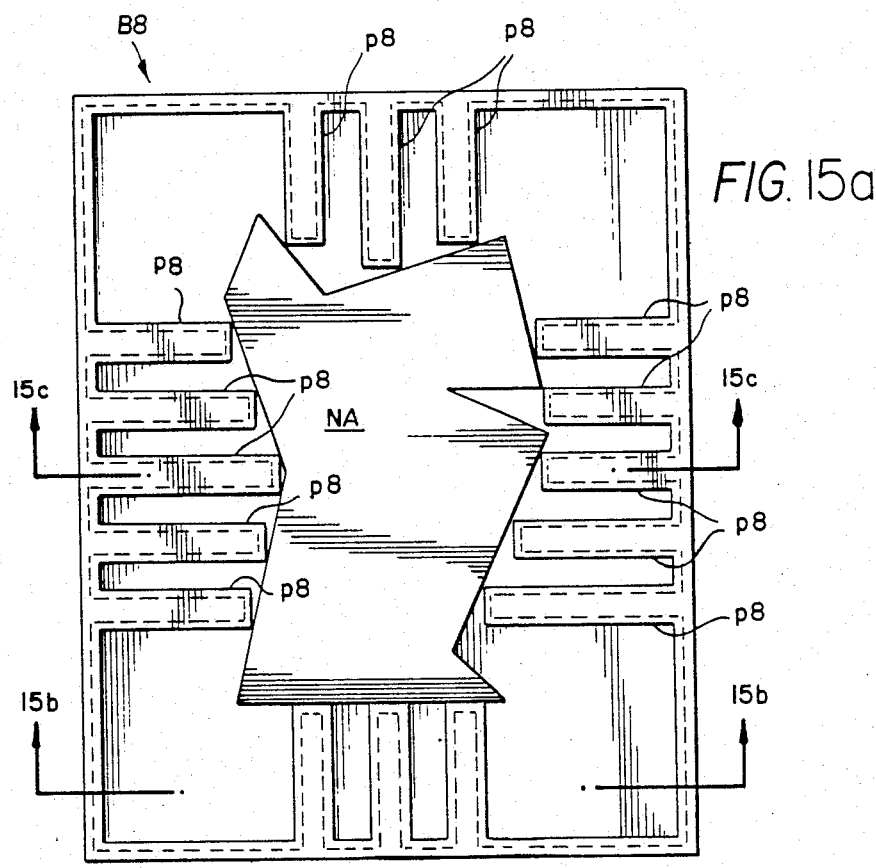
Figure 15B:
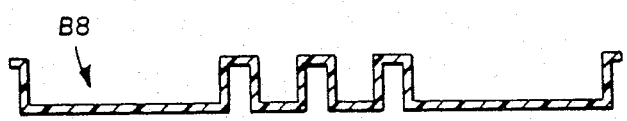
Figure 15C:
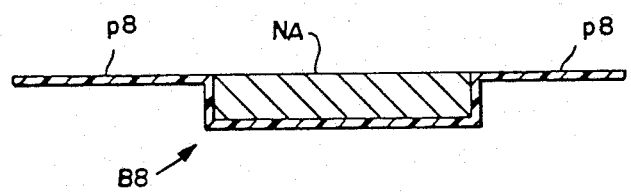

FIG. 15 depicts an adjustable mold M12 which is identical to mold M8 of FIGS. 9-11 except that, in mold M12, each one of the projection-forming members 116, 118, 120, 122 is independently moveable, relative to the others of those members, for selective individual movement toward and away from medial region 114. This embodiment is useful for forming an adapter such as eigth-embodiment adapter B8 disclosed in the above-referenced application. As there disclosed and as here depicted in FIGS. 15a-15c, adapter B8 is similar to adapter B3, shown in FIGS. 9a-9c, but differs therefrom in that its projections p8 on at least one side extend inwardly by differing amounts, in order to accommodate a non-rectangular article NA. FIG. 15 shows mold M12 with its projection-forming members individually positioned to accommodate an irregular-shaped article IA.

Thirteenth (The Preferred) Embodiment

Figure 16:
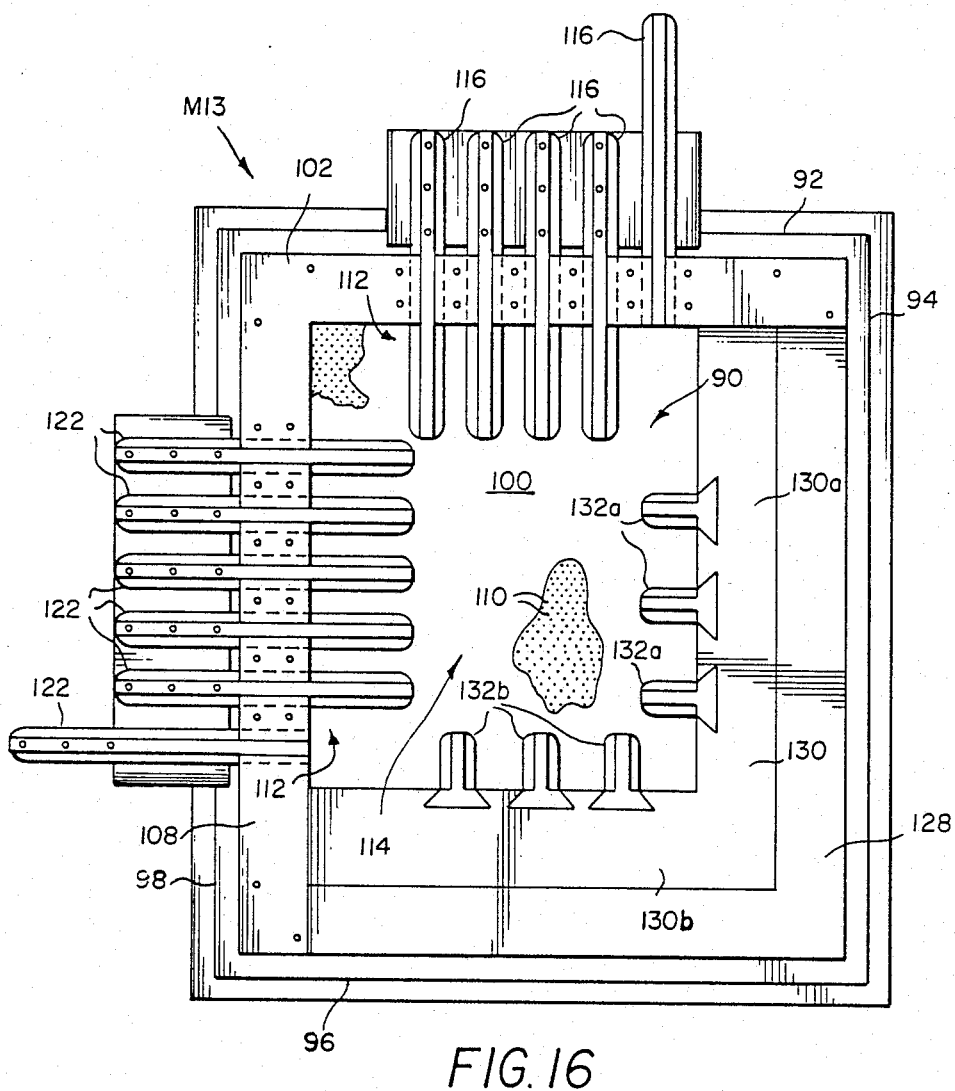

FIG. 16 illustrates an adjustable mold M13 that is similar to mold M11 of FIG. 14 but includes an additional feature which further increases it flexibility. Mold M13 has in its peripheral region 112, inwardly adjacent to side walls 94, 96 in place of flange portions 104, 106, a first removably insertable L-shaped member 128. As does member 126 in mold M11, member 128 of this mold in effect extends both side walls 94, 96 inwardly toward medial region 114 so as to reduce the overall size of the formed adapter when a smaller-size container will suffice for a given article. The aforementioned additional feature of mold M13 is provided by an optional second removably insertable L-shaped member 130 having legs 130a, 130b disposed inwardly adjacent to the corresponding legs of member 128. Member 130 is effect thus further extends side walls 94, 96 inwardly toward medial region 114, and thereby reduces the overall size of the adapter even more to fit a still-smaller-size container, should that be desired.

Optionally extending from legs 130a, 130b toward medial region 114 are pluralities of removably insertable projection-forming members 132a, 132b, respectively, which form projections on the adapter that position a received article more centrally in its container. This option is especially advantageous in situations wherein an off-center position would pose a significant weight imbalance. As shown in FIG. 16, at least those of the projection-forming members 116, 122 that lie closest to side walls 94, 96 are independently moveable away from medial region 114 to facilitate insertion and removal of member 130, especially when members 132a and/or 132b are extending therefrom.

The present invention has now been described in detail with particular reference to its illustrated embodiments. It will be understood, however, that further variations and modifications can be effected within the spirit and scope of this invention.

We claim:

1. A mold for transforming a heated plastic sheet into an adapter intended to restrain a received article from moving inside a container larger than the article, the adapter including a base configured to fit snugly within the container and a plurality of projections on the base that are spaced from each other to receive the article snugly therebetween, said mold comprising:
   means including side and bottom walls defining a cavity with peripheral and medial regions for operatively positioning the plastic sheet for formation for the adapter, said bottom wall being perforated to facilitate creation of a pressure differential on opposite surface of the plastic sheet; and
   means disposed in said cavity peripheral region and moveable toward and away from said cavity medial region for selectively locating the projections on the adapter base, said locating means in said peripheral region including at least one projection-forming member slideably mounted on each of at least two of said side walls for selective movement toward and away from said medial region.

2. A mold as claimed in claim 1 wherein said at least one projection-forming member includes a surface of polygonal configuration substantially perpendicular to said bottom wall and facing said medial region.

3. A mold as claimed in claim 1 wherein said peripheral region includes a removably insertable member adjacent to at least one of said side walls.

4. A mold as claimed in claim 1 wherein said side walls include first, second, third, and fourth side walls; wherein said at least one projection-forming member is slideably mounted on each of said first and second side walls for selective movement toward and away from said medial region; and wherein said peripheral region includes a removably insertable member adjacent to each of said third and fourth side walls.

5. A mold as claimed in claim 1 wherein said side walls include first, second, third, and fourth side walls; wherein said at least one projection-forming member comprises a plurality of projection-forming members slideably mounted on each of said first and second side walls for selective movement toward and away from said medial region; and wherein said peripheral region includes a removably insertable member adjacent to each of said third and fourth side walls.

6. A mold as claimed in claim 1 wherein said at least one projection-forming member comprises a plurality of projection-forming members slideably mounted on each of at least two of said side walls for selective movement toward and away from said medial region.

7. A mold as claimed in claim 6 wherein said peripheral region includes a removably insertable member inwardly adjacent to at least one of said side walls.

8. A mold as claimed in claim 7 wherein inwardly adjacent to said removably insertable member is another removably insertable member.

9. A mold as claimed in claim 8 wherein said other removably insertable member has at least one projection-forming member extending therefrom toward said medial region.

10. A mold as claimed in claim 6 wherein at least one of said projection-forming members in said plurality thereof on at least one of said side walls is independently movable, relative to each other projection-forming member in said plurality, for selective individual movement toward and away from said medial region.

11. A mold as claimed in claim 1 wherein said side walls include first, second, third, and fourth side walls; wherein said locating means in said peripheral region includes a plurality of projection-forming members slideably mounted on each of said first and second side walls for selective movement toward and away from said medial region; wherein said peripheral region includes a first removably insertable member inwardly adjacent to said third and fourth side walls; and wherein a second removably insertable member is disposed inwardly adjacent to said first member.

12. A mold as claimed in claim 11 wherein said second member has a plurality of projection-forming members extending therefrom toward said medial region.

* * * * *